Feb. 13, 1951 G. B. SHERMAN ET AL 2,541,943
ENDLESS TREAD DRIVE FOR TRACTORS
Filed Nov. 11, 1944 4 Sheets-Sheet 1

Inventors:
George B. Sherman
and Hubert M. Clark,
By Dawson Ooms & Booth
Attorneys.

Feb. 13, 1951  G. B. SHERMAN ET AL  2,541,943
ENDLESS TREAD DRIVE FOR TRACTORS
Filed Nov. 11, 1944  4 Sheets-Sheet 3

Inventors.
George B. Sherman
and Hubert M. Clark,
By Dawson, Ooms and Booth.
Attorneys.

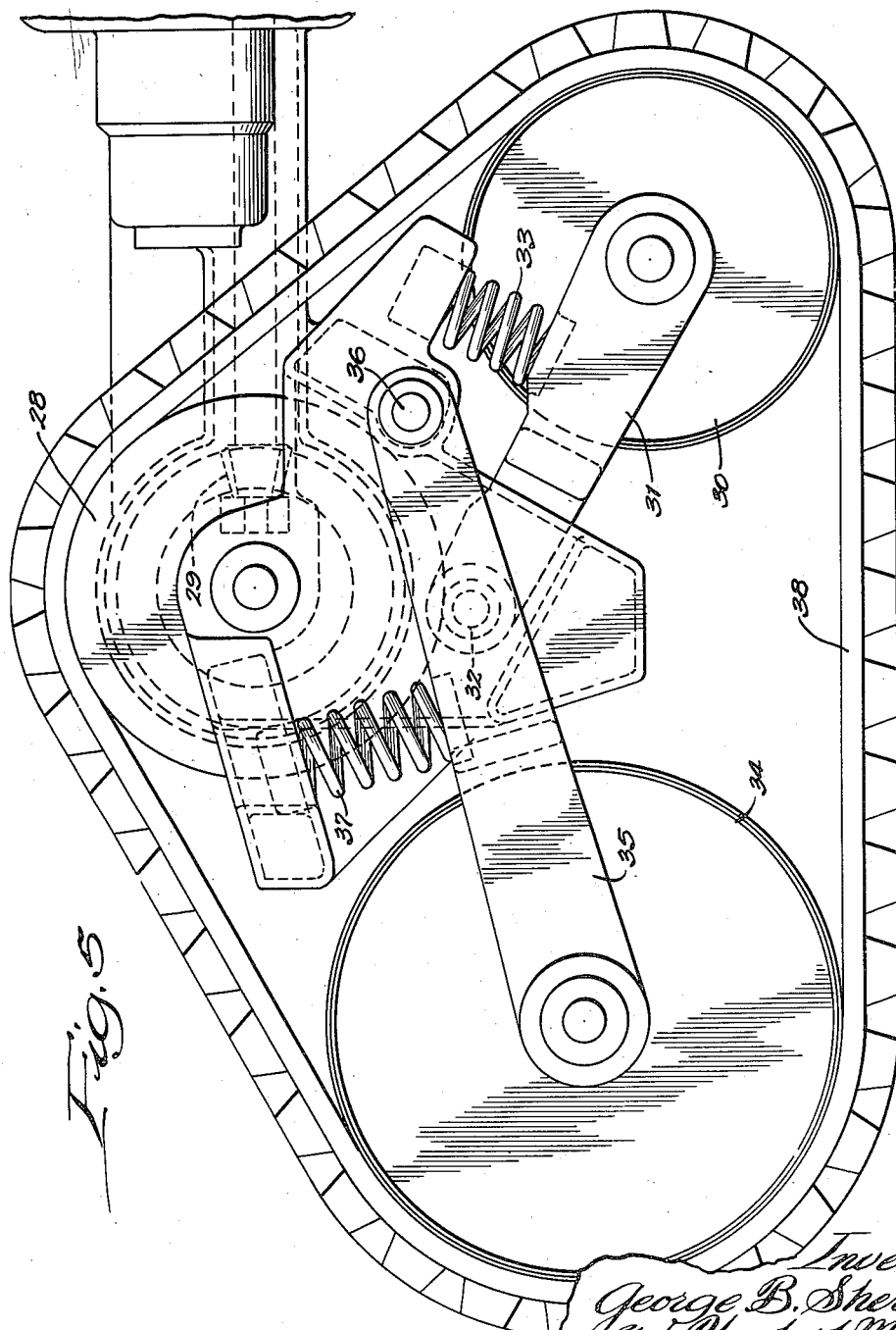

Patented Feb. 13, 1951

2,541,943

UNITED STATES PATENT OFFICE 2,541,943

ENDLESS TREAD DRIVE FOR TRACTORS

George B. Sherman and Hubert M. Clark, Detroit, Mich., assignors, by mesne assignments, to Sherman Industries, Inc., a corporation of Delaware Application November 11, 1944, Serial No. 562,964

13 Claims. (Cl. 180—9.1)

This invention relates to tractor and more particularly to tractors for general agricultural purposes.

The large majority of farms today are farmed with horses despite the fact that tractors have been known and available for many years. This is largely because tractors as heretofore known have not been abel to operate to advantage in small or irregularly shaped fields or where the ground is hilly or over soft, sandy, or wet soil or soil which is hard or full of obstructions. Due to the manner of connecting implements to the tractors shifting of weight from the front to the rear of the tractor occurs in use and this, together with the high center of gravity resulting from the necessary cultivating clearance, makes the tractors unsafe under many operating conditions. To compensate for shifting of weight the tractors have been made heavier and this increases their cost and makes them difficult to operate.

It is the principal object of the present invention to provide a tractor which overcomes these objections and which can operate effectively under adverse conditions. To this end the invention provides a tractor which is smaller and has less parts and is therefore less expensive than tractors heretofore known, which has a low center of gravity while maintaining adequate cultivating clearance, which is substantially impossible to tip over so that it is safe, which can be operated with a minimum of physical effort and maximum comfort, which provides a maximum drawbar pull with minimum weight, and in which there is a minimum shifting of weight from front to rear of the tractor in operation.

Another object is to provide a tractor which has a tricycle suspension formed by a front driving unit and laterally spaced steerable wheels at the rear.

Still another object is to provide a tractor in which the drive is thru a unit including a driving wheel and a pair of bogie wheels around which an endless track is supported. The drive unit preferably includes a spring suspension for the front bogie wheel so arranged that the front wheel normally carries the major part of the weight on the unit, which is preferably mounted to exert a substantially constant force against the ground in all positions and which is moved in a path such as to maintain the track length around the wheels substantially constant.

A further object of the invention is to provide a tractor in which laterally spaced wheels are carried by substantially horizontal pivoted arms so that the lateral space between the wheels can easily be adjusted.

A still further object is to provide a tractor in which laterally spaced wheels are connected to a steering linkage so arranged as to maintain the wheels substantially parallel in any laterally adjusted position thereof.

A still further object is to provide a tractor including a power takeoff connected to the engine separately from the tractor driving unit. In one preferred construction, the driving unit is connected to the engine shaft at one end of the engine and the power takeoff is connected to the opposite end of the engine shaft.

The above and other objects and advantages of the invention have been more readily apparent from the following description, when read in connection with the accompanying drawing, in which—

Figure 4 is a partial section on the line 4—4 of Figure 3; and

Figure 5 is a view similar to Figure 3 of an alternative construction.

Figure 1:
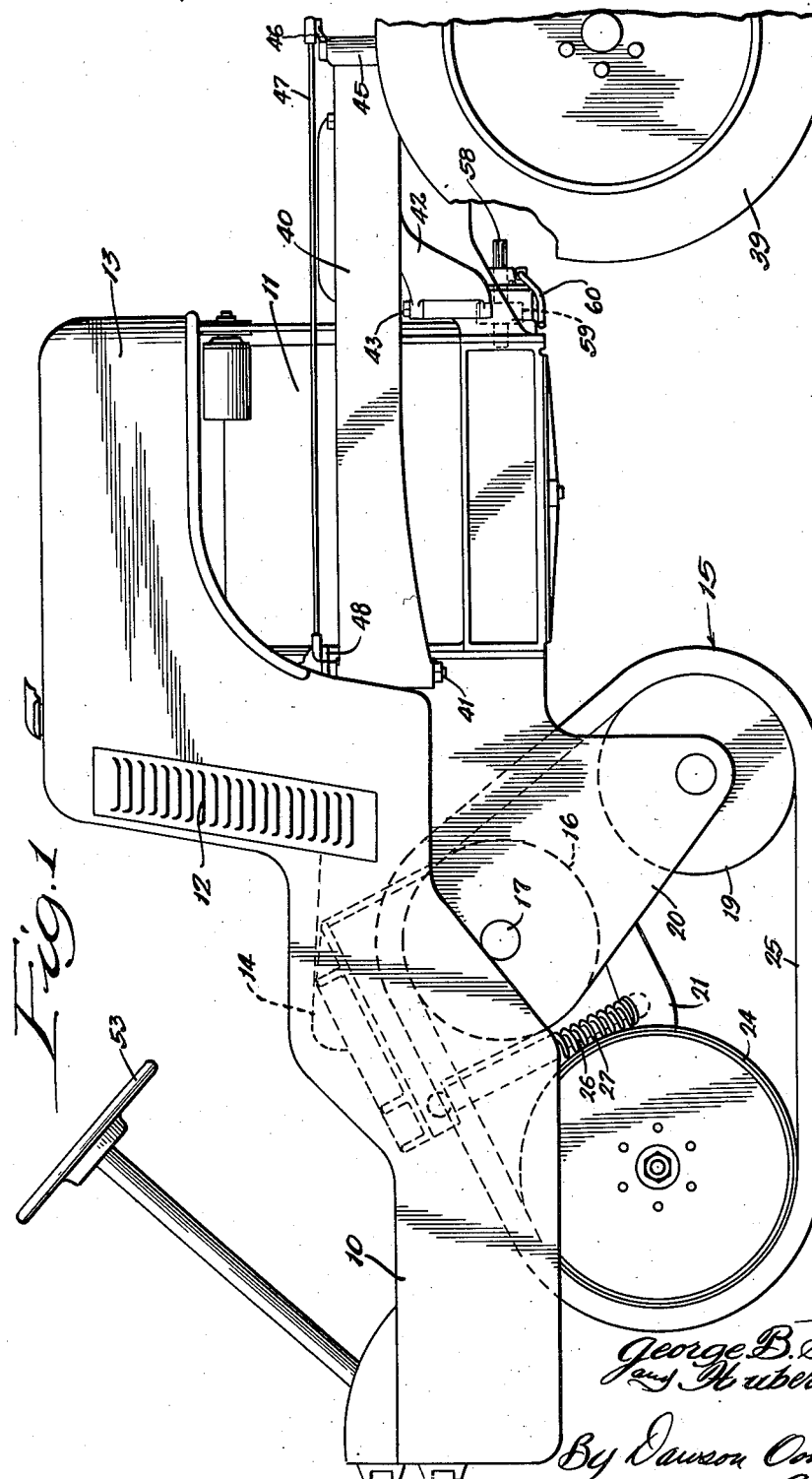
Figure 1 is a side elevation of a tractor embodying the invention.
Figure 2:
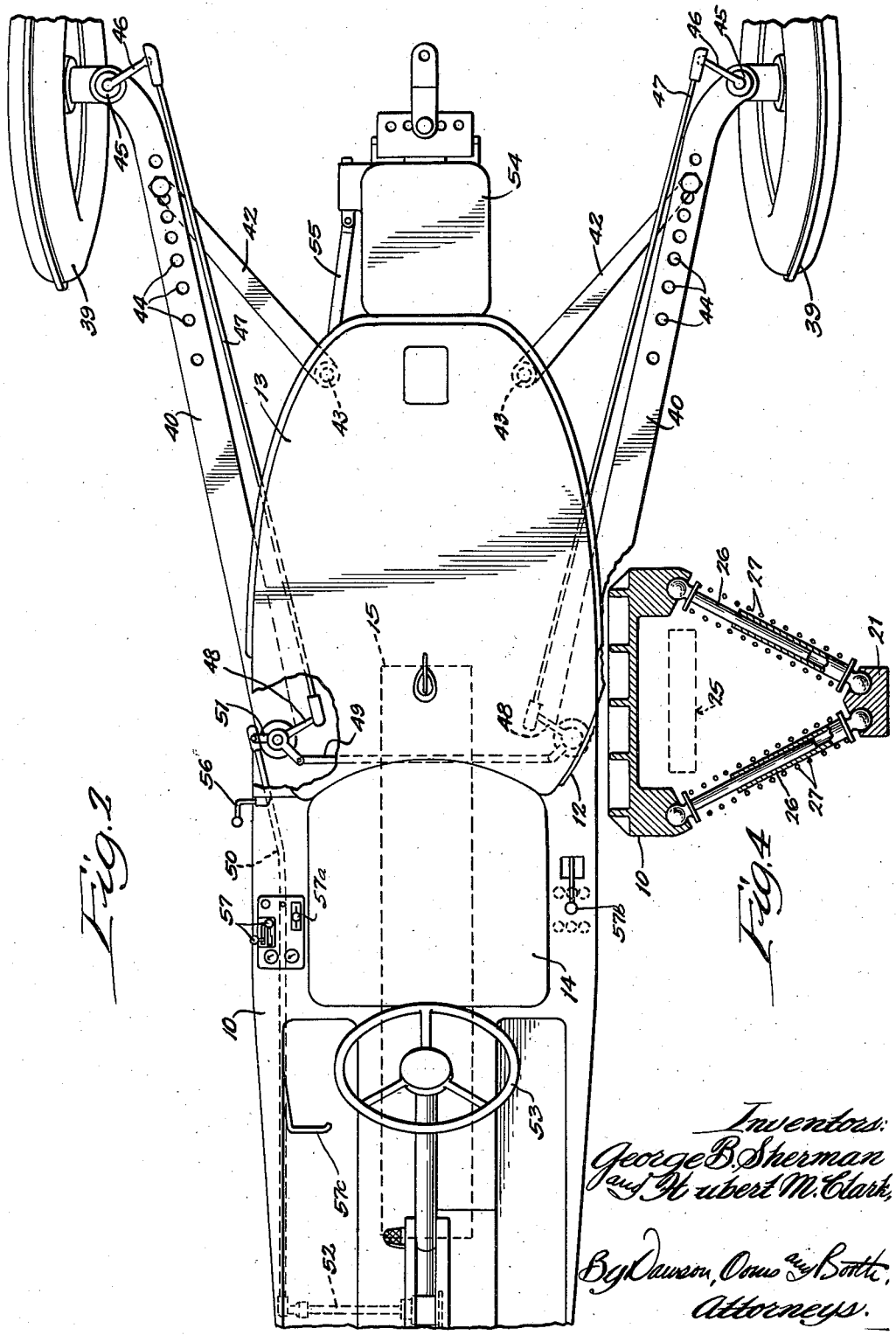
Figure 2 is a top plan view.

The tractor as best seen in Figures 1 and 2, comprises a main frame 10 on which an engine indicated generally at 11 is mounted. As seen in Figure 1, the engine is mounted intermediate the ends of the frame and is provided with a cooling radiator behind the grill 12 at the forward end of the engine and with a fuel supply tank 13 overlying the engine. The grill 12 forms a support for the back of an operator's seat indicated at 14.

Figure 3:
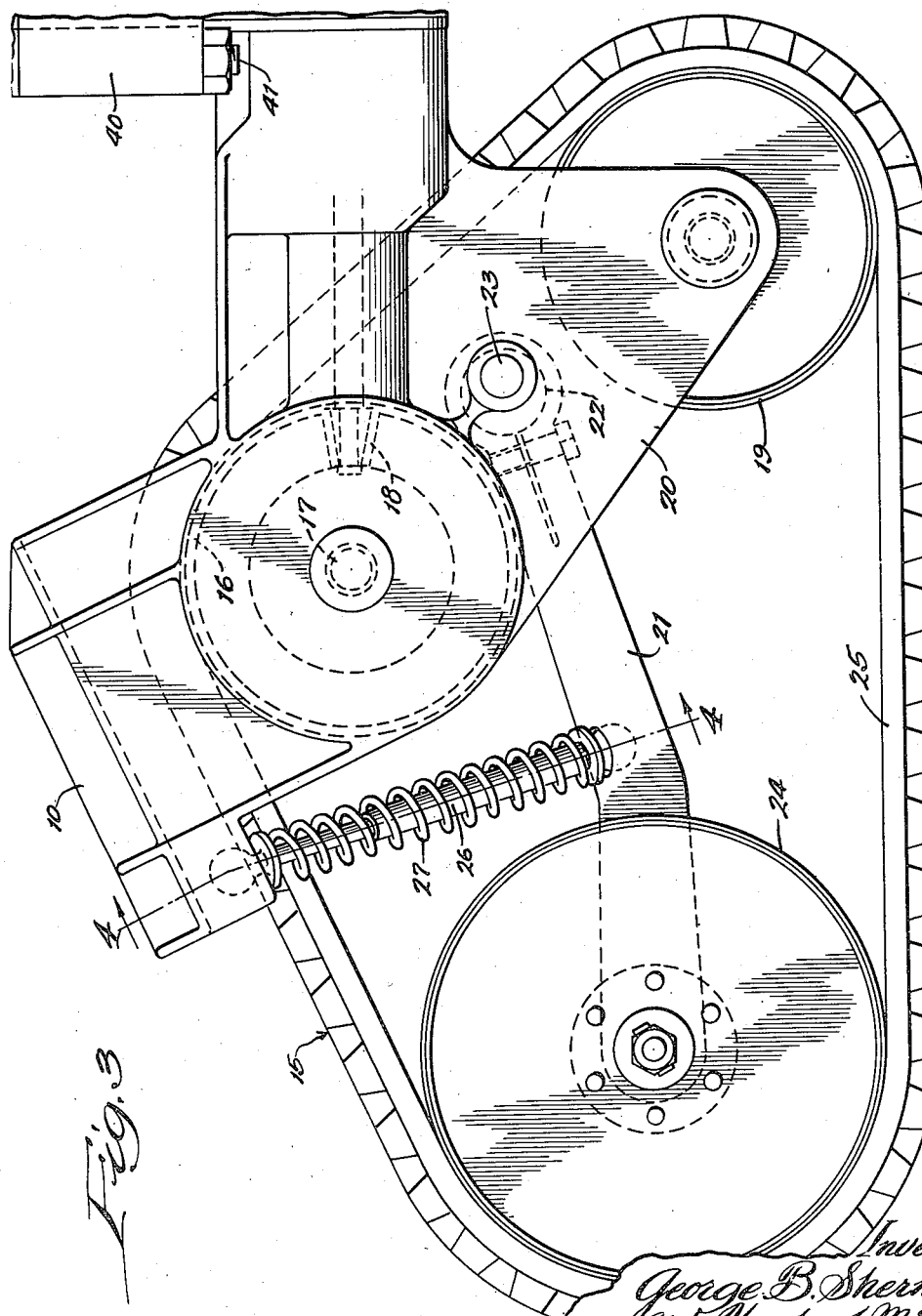
Figure 3 is an enlarged side elevation of the driving unit of Figure 1.

The frame is suspended on a front drive unit indicated generally at 15 and which is constructed as best seen in Figure 3. As shown in this figure, the drive unit includes a driving or sprocket wheel 16 which is mounted on an axle 17 journalled on the main frame 10. The wheel 16 is driven from the engine thru a bevel pinion or the like indicated at 18 which is connected to the engine thru the usual clutch and transmission mechanism. Since the clutch and transmission may be standard parts they are not shown in detail herein.

Below and to the rear of the driving wheel 16 a rear bogie wheel 19 is mounted on an extension 20 of the frame 10 on an axis fixed relative to the frame. Between the driving wheel and the rear bogie wheel, a supporting arm 21 is pivoted on the frame extension 20 and extends forwardly therefrom. As shown in Figure 3, the arm 21 is formed at its end with a split collar portion engaging an eccentric 22 on a supporting shaft whose ends are journalled in bosses 23 on the frame. By turning the eccentric 22 in the end of the arm 21 the effective length of the arm can easily be adjusted to tighten or loosen the track described later. At its forward end, the arm 21 carries a front bogie wheel 24 which lies below and in front of the driving wheel 16. An endless track 25 which may be of any desired construction, such, for example, as molded rubber or the like reinforced by longitudinally extending cables, fits around the several wheels. When the driving or sprocket wheel is turning, it will drive the track which rides over and is held against the ground by the bogie wheels 19 and 24.

The arm 21 is urged downwardly about its pivot to press the bogie wheel 24 against the ground by spring means as shown more particularly in Figure 4. As shown in this figure, a pair of telescopically interengaged guide members 26 are connected at their lower ends thru ball and socket joints to the arm 21 and at their upper ends to similar joints to spaced points on the frame 10. Compression springs 27 are fitted around the guide members 26 and act therethru to urge the arm 21 downwardly relative to the frame. It will be noted that the guide members and springs lie at an angle to each other so that the downward component of the force exerted thereby on the arm 21 decreases as the arm rises. Since raising of the arm compresses the springs and increase the force exerted thereby the changing angle of the springs may be made to compensate substantially exactly for the spring increase so that the downward force on the arm 21 will be substantially constant in all positions of the arm. With this construction, the loading on the front bogie wheel and on the front part of the track may be kept substantially constant under all operating conditions.

According to one feature of the invention the springs 27 are so selected and arranged that the major portion of the total load on the driving unit will be carried by the front bogie wheel. Since the track is formed with cleats or roughened portion to improve its grip against the ground this arrangement provides for loading the forward portion of the track where it first engages the ground to the maximum extent so that the grips on the track will be filled to provide the maximum tractive effect. As the track moves toward the rear bogie wheel it will maintain its grip against the ground with a lesser degree of pressure so that by loading the forward portion of the track to the maximum extent, the maximum tractive engagement with the ground is provided.

It will be noted from the arrangement of Figure 3, that the pivotal position of the arm 21 is so selected that as it moves about its pivot in response to uneven ground conditions, it will travel in an arcuate path such that the total length of the track around the several wheels remains substantially constant. With this arrangement, the desired tension may be kept on the track at all times without requiring it to stretch or contract unduly. It will also be understood that one or more idler bogies may be provided between the front and rear bogies if desired to hold the bottom part of the track against the ground throughout its length.

In addition to improving the tractive effect, the arrangement of the driving unit to carry the major portion of the load on the front bogie wheel improves the steering. Since the rearward portion of the driving unit is loaded relatively lightly, it can slip sideways without material resistance while the forward portion of the unit remains in firm contact with the ground. This permits the unit to turn readily without interfering with its tractive grip on the ground.

An alternative driving unit is illustrated in Figure 5 in which both the front and rear bogie wheels are resiliently supported on the frame. In this construction the driving wheel 28 is connected to the engine thru a driving pinion 29. The rear bogie wheel 30 is supported on an arm 31 which is pivoted to the frame at 32 and which is urged downwardly by one or more compression springs 33. The forward bogie wheel 34 is carried by an arm 35 which is pivoted to the frame at 36 between the driving wheel and the rear bogie wheel. A compression spring 37 which may be arranged as more particularly shown in Figure 4 urges the arm 35 downward. The pivot points for the arms 31 and 35 are so selected that the bogie wheels may move simultaneously thru a limited range without tending to stretch the endless track 38 which extends around the bogie wheels and the driving wheel. In this construction as in that of Figure 3, springs 37 are preferably stiffer than the springs 33 so that the major portion of the weight on the driving unit will be carried by the front bogie wheel.

The rear end of the tractor is supported on laterally spaced steerable wheels 39 which are carried by arms 40 pivoted to the frame on vertical pivots 41 and extending rearwardly therefrom. The arms 40 are adapted to be moved about the pivots 41 to vary the spacing between the wheels 39 and may be held in adjusted position with any desired space between the wheels. As shown, links 42 are pivoted on the frame at 43 and are adapted to be connected at their outer ends to the arms 40 by means of pins or bolts fitting thru any selected one of a series of holes 44 in the arms. With this construction, the space between the rear wheels 39 can easily be adjusted simply by swinging the arms 40 out to the desired position and locking them in place thru the links 42.

The wheels 39 are adapted to be steered and for this purpose they are supported on vertical pivots 45 at the outer ends of the arms 40. Steering arms 46 are secured to the wheel pivots to turn the wheels and as shown extend inwardly and rearwardly from the wheel pivots. The arms 46 are adapted to be moved by steering links 47 pivoted at one end to the ends of the arms 46 and at their opposite ends to steering levers 48 which are pivoted on the frame coaxially with the pivots 41. As shown, the steering levers 48 extend inwardly and rearwardly from their pivots and lie substantially parallel to the steering arms 46 respectively.

The steering levers 48 are interconnected by a connecting link 49 so that the levers 48 will be turned together in opposite directions. The levers are controlled by a steering rod 50 connected to an arm 51 extending from one of the levers 48. The arm 50 is connected thru a linkage indicated at 52 to a steering wheel 53 adjacent the operator's seat 14.

By turning the wheel 53, the rear wheels 39 will be turned about their pivots 45 thru the steering linkage as will be apparent. Furthermore, due to the arrangement of the levers 48, link 47 and arms 46, when the arms 40 are moved to separate the wheels, the links 47 will be placed under tension and will turn the wheels 39. By properly proportioning the lengths of the levers 48 and arms 46, this turning can be made such as to maintain the wheels 39 substantially parallel in all adjusted positions. Therefore, the only operation necessary to vary the spacing between the wheels 39 is to move the arms 40 to the desired position and lock them in place by means of the links 42, the direction of the wheels being automatically adjusted thru the steering linkage.

The tractor is adapted to be connected to an implement or other desired type of load thru a head unit indicated generally at 54 which may be of the type more particularly described and claimed in the application of George B. Sherman, Serial No. 447,341 filed June 17, 1942, which became Patent No. 2,394,210, February 5, 1946. The unit 54 may carry a leveling mechanism operated by shaft 55 and crank 56 to level the implement and may operate automatically as described in said Sherman application to maintain the implement at the proper depth in the ground. Adjustment of the control unit to vary the implement depth and to raise the implement for turning may be accomplished from adjacent the driver's seat thru control levers 57. The tractor engine speed may similarly be controlled thru a throttle lever 57a, the transmission thru a shift lever 57b and the clutch thru a pedal 57c.

For many purposes it is desirable to provide a power take off which may be used in connection with the implements connected to the tractor or for utilizing the tractor as a stationery power plant. For this purpose a power take off shaft 58 is carried by and projects from the rear end of the engine as seen in Figure 1. The shaft 58 is connected to the engine thru a clutch 59 which may be controlled by a lever 60. With this arrangement, it will be noted that the shaft 58 can be driven continuously whether or not the tractor is in motion. This is desirable for operating many types of machines such as power driven mowers so that the cutting mechanism of the mower may continue to cut even though the tractor is slowed down or stopped. Since the power take off shaft 58 and its clutch 59 are at the opposite end of the engine from the connection to the driving unit, the take off shaft may be controlled and operated independently of the driving unit.

In operating the tractor it will be noted that the weight of the operator and a substantial portion of the weight of the frame and engine are carried by the front driving unit. Since the tractive effect comes from the front portion of the tractor, the weight distribution is affected very little by the tractive pull of a load connected to the head 54 and it is also affected to a very minor extent by varying contour of the ground over which the tractor is operated. Thus the weight pressing the driving unit against the ground is substantially constant under all conditions of operation. This provides a tractor which is very flexible in its uses and which is able to operate in places and under conditions in which a conventional tractor can operate only inefficiently, if at all. Thus an extremely flexible tractor is provided which is able to perform a wide variety of operations under widely varying conditions.

While one embodiment of the invention has been shown and described in detail herein, it will be understood that this is illustrative only and is not intended as a definition of the scope of the invention, reference being had for this purpose to the appended claims.

What is claimed is:

1. A tractor comprising a frame, an engine on the frame, a pair of steerable wheels adjacent one end of the frame, and a driving unit adjacent the other end of the frame, the driving unit including, a driving wheel on the frame above the bottom thereof, means for drivably connecting the driving wheel to the engine, front and rear bogie wheels below the driving wheel, an arm pivoted to the frame between the driving wheel and the rear bogie wheel on which the front bogie wheel is mounted, spring means urging the arm downward about its pivot, and an endless track around the wheels.

2. A tractor comprising a frame, an engine on the frame, a pair of steerable wheels adjacent one end of the frame, and a driving unit adjacent the other end of the frame, the driving unit including, a driving wheel on the frame above the bottom thereof, means for drivably connecting the driving wheel to the engine, front and rear bogie wheels below the driving wheel, an arm pivoted to the frame between the driving wheel and the rear bogie wheel on which the front bogie wheel is mounted, a compression spring acting between the arm and the frame arranged at such an angle that it will exert a substantially constant downward force on the arm regardless of the position of the arm, and an endless track around the wheels.

3. A tractor comprising a frame, an engine on the frame, a pair of steerable wheels adjacent one end of the frame, and a driving unit adjacent the other end of the frame, the driving unit including a driving wheel on the frame, means for drivably connecting the driving wheel to the engine, front and rear bogie wheels below the driving wheel, an endless track around the wheels, and means yieldingly mounting at least the front bogie wheel on the frame and so constructed and arranged that the front bogie wheel normally carries a greater amount of weight than the rear bogie wheel.

4. A tractor comprising a frame, an engine on the frame, a pair of steerable wheels adjacent one end of the frame, and a driving unit adjacent the other end of the frame, the driving unit including a driving wheel on the frame above the bottom thereof, means for drivably connecting the driving wheel to the engine, a rear bogie wheel mounted on a fixed axis on the frame below and to the rear of the driving wheel, an arm pivoted on the frame between the driving wheel and the rear bogie wheel, a front bogie wheel carried by the arm below and to the front of the driving wheel, spring means urging the arm downward, and an endless track around the wheels.

5. A tractor comprising a frame, an engine on the frame, a pair of steerable wheels adjacent one end of the frame, and a driving unit adjacent the other end of the frame, the driving unit including a driving wheel on the frame above the bottom thereof, means for drivably connecting the driving wheel to the engine, a rear bogie wheel mounted on a fixed axis on the frame below and to the rear of the driving wheel, an arm pivoted on the frame between the driving wheel and the rear bogie wheel, a front bogie wheel carried by the arm below and to the front of the driving wheel, a pair of compression springs acting between the arm and the frame lying at an angle to each other to exert a substantially constant downward force on the arm regardless of its pivotal position, and an endless track around the wheels.

6. A tractor comprising a frame, an engine on the frame, a pair of steerable wheels adjacent one end of the frame, and a driving unit adjacent the other end of the frame, the driving unit including a driving wheel on the frame above the bottom thereof, means for drivably connecting the driving wheel to the engine, a pair of arms pivoted to the frame adjacent the driving wheel and extending forwardly and rearwardly respectively, bogie wheels carried by the arms, and an endless track around the driving wheel and the bogie wheels.

7. A driving unit for a tractor comprising a driving wheel adapted to be power driven, front and rear bogie wheels below and to the front and rear of the driving wheel, an arm carrying the front bogie wheel and pivoted between the driving wheel and the rear bogie wheel, an endless track around the wheels, and a compression spring urging the arm downward and lying at such an angle that it exerts a substantially constant force on the arm regardless of the pivotal position of the arm.

8. A driving unit for a tractor comprising a driving wheel adapted to be power driven, front and rear bogie wheels below and to the front and rear of the driving wheel, an endless track around the wheels, means mounting the rear bogie wheel on an axis fixed relative to the axis of the driving wheel, and means yieldingly mounting the front bogie wheel for movement in an arcuate path about a center lying generally between the driving wheel and the rear bogie such as to maintain the total distance around the three wheels substantially constant.

9. A driving unit for a tractor having a frame comprising a driving wheel mounted on a fixed axis on the frame, a rear bogie wheel mounted on a fixed axis on the frame below and to the rear of the driving wheel, an arm pivoted on the frame between the driving wheel and the bogie wheel and extending forward from its pivot, a front bogie wheel carried by the arm below and in front of the driving wheel, an endless track around the wheels, and spring means urging the arm downward about its pivot.

10. A driving unit for a tractor having a frame comprising a driving wheel mounted on a fixed axis on the frame, a rear bogie wheel mounted on a fixed axis on the frame below and to the rear of the driving wheel, an arm pivoted on the frame between the driving wheel and the bogie wheel and extending forward from its pivot, a front bogie wheel carried by the arm below and in front of the driving wheel, an endless track around the wheels, and a pair of compression springs acting between the arm and the frame to urge the arm downward, the springs lying at an angle to each other such that they will exert a substantially constant downward force on the arm regardless of its position.

11. A driving unit for a tractor comprising a frame, a driving wheel mounted on the frame, a pair of bogie wheels below and on opposite sides of the driving wheel, an endless track around the wheel, and means mounting one of the bogie wheels for arcuate movement about a center lying between the driving wheel and the other bogie wheel to maintain the total distance around the three wheels substantially constant.

12. A driving unit for a tractor comprising a frame, a driving wheel mounted on the frame, a pair of bogie wheels below and on opposite sides of the driving wheel, an endless track around the wheels, means mounting one of the bogie wheels for arcuate movement about a center lying between the driving wheel and the other bogie wheel to maintain the total distance around the three wheels substantially constant, and a compression spring acting between the frame and said one of the bogie wheels and lying at an angle to the path of movement of the bogie wheel such as to exert a substantially constant downward force on the bogie wheel regardless of its position.

13. A driving unit for a tractor comprising a frame, a driving wheel mounted on the frame, a pair of bogie wheels below and on opposite sides of the driving wheel, an endless track around the wheels, a pair of arms pivoted on the frame on spaced centers and respectively carrying the bogie wheels, the arm for each bogie wheel lying below and crossing the vertical center plane of the driving wheel, and resilient means urging the arms downward.

GEORGE B. SHERMAN.
HUBERT M. CLARK.

REFERENCES CITED

The following references are of record in the file of this patent:

UNITED STATES PATENTS

| Number | Name | Date |
| --- | --- | --- |
| 1,126,960 | Day | Feb. 2, 1915 |
| 1,210,056 | Fairman | Dec. 26, 1916 |
| 1,255,218 | Paulsen | Feb. 5, 1918 |
| 1,283,083 | Coldwell | Oct. 29, 1918 |
| 1,330,253 | Fuller | Feb. 10, 1920 |
| 1,366,413 | Olin | Jan. 25, 1921 |
| 1,606,706 | Johnston et al | Nov. 9, 1926 |
| 1,735,929 | Lyback | Nov. 19, 1929 |
| 1,765,188 | Webb | June 17, 1930 |
| 1,808,735 | Henneuse et al. | June 2, 1931 |
| 1,961,809 | Wood | June 5, 1934 |
| 1,980,276 | Kegresse | Nov. 13, 1934 |
| 2,041,599 | Fergusson | May 19, 1936 |
| 2,059,261 | Marshall | Nov. 3, 1936 |
| 2,191,961 | Howell | Feb. 27, 1940 |
| 2,315,421 | Heaslet | Mar. 30, 1943 |

FOREIGN PATENTS

| Number | Country | Date |
| --- | --- | --- |
| 510,015 | Germany | Oct. 15, 1930 |